(12) United States Patent
Feuermann et al.

(10) Patent No.: US 6,336,738 B1
(45) Date of Patent: Jan. 8, 2002

(54) SYSTEM AND METHOD FOR HIGH INTENSITY IRRADIATION

(76) Inventors: Daniel Feuermann; Jeffrey M. Gordon, both of Midreshet Ben-Gurion; Morris Priwler, 37 Nahal Snir, Modi'in, all of (IL); Harald Ries, Bluetenstrasse 8, D-80799, Munich (DE)

( * ) Notice: Subject to any disclaimer, the term of this patent is extended or adjusted under 35 U.S.C. 154(b) by 0 days.

(21) Appl. No.: 08/901,663

(22) Filed: Jul. 28, 1997

(51) Int. Cl.⁷ ................................................ F21V 8/00
(52) U.S. Cl. ........................................ 362/583; 362/551
(58) Field of Search ................................ 362/551, 552, 362/554, 558, 560, 583

(56) References Cited

U.S. PATENT DOCUMENTS 4,459,643 A * 7/1984 Mori ........................... 362/32
4,740,870 A * 4/1988 Moore et al. ................. 362/32
5,301,090 A * 4/1994 Hed ............................. 362/32
5,560,700 A * 10/1996 Levens ......................... 362/32

* cited by examiner

Primary Examiner—Stephen Husar
(74) Attorney, Agent, or Firm—Mark M. Friedman

(57) ABSTRACT

A system and method for concentrating the intensity of light emitted by a high-intensity source for delivery to a remote target, so that the power density of the active radiating region of the source is nearly restored at the target. The source is surrounded by a plurality of nonimaging concentrators. If the source is elongated, the concentrators are similarly elongated and parallel to the source. If the source is compact, the preferred geometric pattern of the concentrators is dodecahedral. The geometry of the concentrators is designed in accordance with the edge-ray principle of nonimaging optics. Channels such as optical fibers or light pipes are coupled optically to the absorbers of the concentrators, to conduct the concentrated light to the remote target.

13 Claims, 10 Drawing Sheets

SYSTEM AND METHOD FOR HIGH INTENSITY IRRADIATION

FIELD AND BACKGROUND OF THE INVENTION

The present invention relates to remote irradiation systems and, more particularly, to a system and method for irradiating a target with light from a high-intensity source, at a power density almost as high as that of the light emitted by the source.

Conventional metal-halide, xenon, argon, halogen, microwave-sulfur and related lamps possess radiating sources (e.g., filaments, discharge arcs or radiating spheres) of high power density at the source surface. Such flux levels are well suited to applications that range from high-temperature heating (such as semiconductor processing), to certain medical procedures (such as tissue welding, coagulation, external skin disorder treatment, cosmetic surgery, and others), to remote lighting.

There is no fundamental principle that forbids restoring these high power densities on distant targets; yet the inherently high flux levels have not been successfully harvested, for a number of related reasons. First, the surface area over which radiation is emitted is small relative to lamp size and is deeply recessed within a transparent envelope. Therefore the power density at the entrance to any light-collection device is reduced substantially. Second, imaging systems tend to suffer large aberrations, in particular for collecting rays from the large angular emission range of these sources. Hence either their collection efficiency is low, or their average power density is compromised significantly. If the imaging system has high collection efficiency, then it tends to be complex and unwieldy.

The optical performance of a single rotationally-symmetric device is inherently limited by the geometric (shape) mismatch between source and target due to skewness conservation. This translates into either substantial ray rejection for high flux density, or markedly diluted power density at high collection efficiency.

There is thus a widely recognized need for, and it would be highly advantageous to have, a system and method for efficiently concentrating the collected radiation, from its diluted power density outside the transparent envelope that encloses the light source, back to the flux level intrinsic to the source.

SUMMARY OF THE INVENTION

According to the present invention there is provided a system for delivery of high intensity light to a target, including: (a) a source of the high intensity light; and (b) a plurality of nonimaging concentrators surrounding at least a portion of the source, each of the nonimaging concentrators having an entrance aperture, all of the entrance apertures facing the source.

According to the present invention there is provided a method for delivering high intensity light to a target, including the steps of: (a) providing a source of the light; (b) concentrating at least a portion of the light emerging from the source, using at least one nonimaging concentrator; and (c) conducting at least a portion of the concentrated light to the target.

According to the present invention there is provided a system for delivery of high intensity light to a target, including: (a) a source of the high intensity light; and (b) a mechanism, surrounding substantially all of the source, for collecting the light and conducting the light to the target.

According to the present invention there is provided a method for delivering high intensity light to a target, including the steps of: (a) providing a source of the light; (b) surrounding substantially all of the source with a mechanism for collecting the light; (c) collecting the light, using the mechanism; and (d) conducting the collected light to the target.

According to the present invention there is provided a method for efficiently delivering light from a source along an optical path to a target, including the step of including a nonabsorbing monochromator in the optical path.

The principle of the present invention can be best understood by reference to the embodiment thereof illustrated schematically in FIG. 1. A spherical transparent envelope 12, concentric with and surrounding a radiating source 10, is tiled with small light channels 14 of circular cross section. Light channels 14 may be optical fibers or light pipes. Losses due to the imperfect packing of a spherical surface with small circular apertures are on the order of about 10%. Distal ends 16 of light channels 14 are grouped to form a narrow angle input to a maximum-flux nonimaging concentrators 18, one of which is shown in FIG. 1. The total area of absorbers 20 of concentrators 18 is equal to the surface area of source 10, so the absorber power density approaches the power density of source 10. In addition to the loss associated with imperfect tiling of the spherical surface of envelope 12 at the light collection side, there is 10% or more dilution of power density at distal ends 16 in packing light channels 14 into entrance apertures 22 of concentrators 18. In principle, the packing losses can be eliminated by fusing distal ends 16.

The drawback of this embodiment is that an enormous number of channels 14 are required. Preferably, then, a small number of maximum-flux nonimaging concentrators that are tailored to the source are placed with their entrance apertures as close to the lamp envelope as possible, substantially surrounding the lamp. The absorbers of these concentrators are optically coupled to a far smaller number of light channels than in the design of FIG. 1, and these light channels are used to transport radiation to remote locations.

The high intensity light of the present invention includes any suitable form of electromagnetic radiation that obeys the laws of geometric optics on the relevant length scale, particularly visible light, infrared light and ultraviolet light. Although the scope of the present invention includes designs in which the concentrators are in contact with the source, for example if the source is a fluorescent lamp, the emphasis herein is on embodiments with sources embedded within transparent envelopes, with the concentrators in contact with the envelopes. These sources include conventional high-intensity lamps such as metal-halide lamps, noble gas (for example, argon or xenon) lamps, halogen lamps and microwave-sulfur lamps.

There are two classes of common high-intensity lamps:
(1) lamps with elongated sources, with the length of the cylindrical filament or discharge region being far greater than the source diameter; and
(2) lamps with compact sources, e.g., spherical radiators or short squat arc discharges, having dimensions far smaller than the envelope dimensions.

In the case of a lamp with an elongated source and a similarly elongated envelope, the concentrators are similarly elongated. Typically, both the lamp and the concentrators are straight, with the concentrators disposed parallel to the lamp. The scope of the present invention includes other geometries, however, for example concentrators wrapped helically around a straight lamp. In the case of a lamp with a substantially spherical envelope, the concentrators are disposed around the envelope according to the surfaces of a Platonic solid, most preferably a dodecahedron.

The scope of the present invention includes concentrators based on interior reflective surfaces only, concentrators consisting of dielectrics, and concentrators that are lens-mirror combinations, with the latter two types of concentrators being preferred. The shapes of the concentrators are designed in accordance with the edge-ray principle of non-imaging optics, as described below.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for concentrating the output of a high-intensity light source to a power density that approaches the power density of the source. Specifically, the present invention can be used to irradiate targets remote from the source with high-intensity light.

The principles and operation of high intensity irradiation according to the present invention may be better understood with reference to the drawings and the accompanying description.

Figure 1:
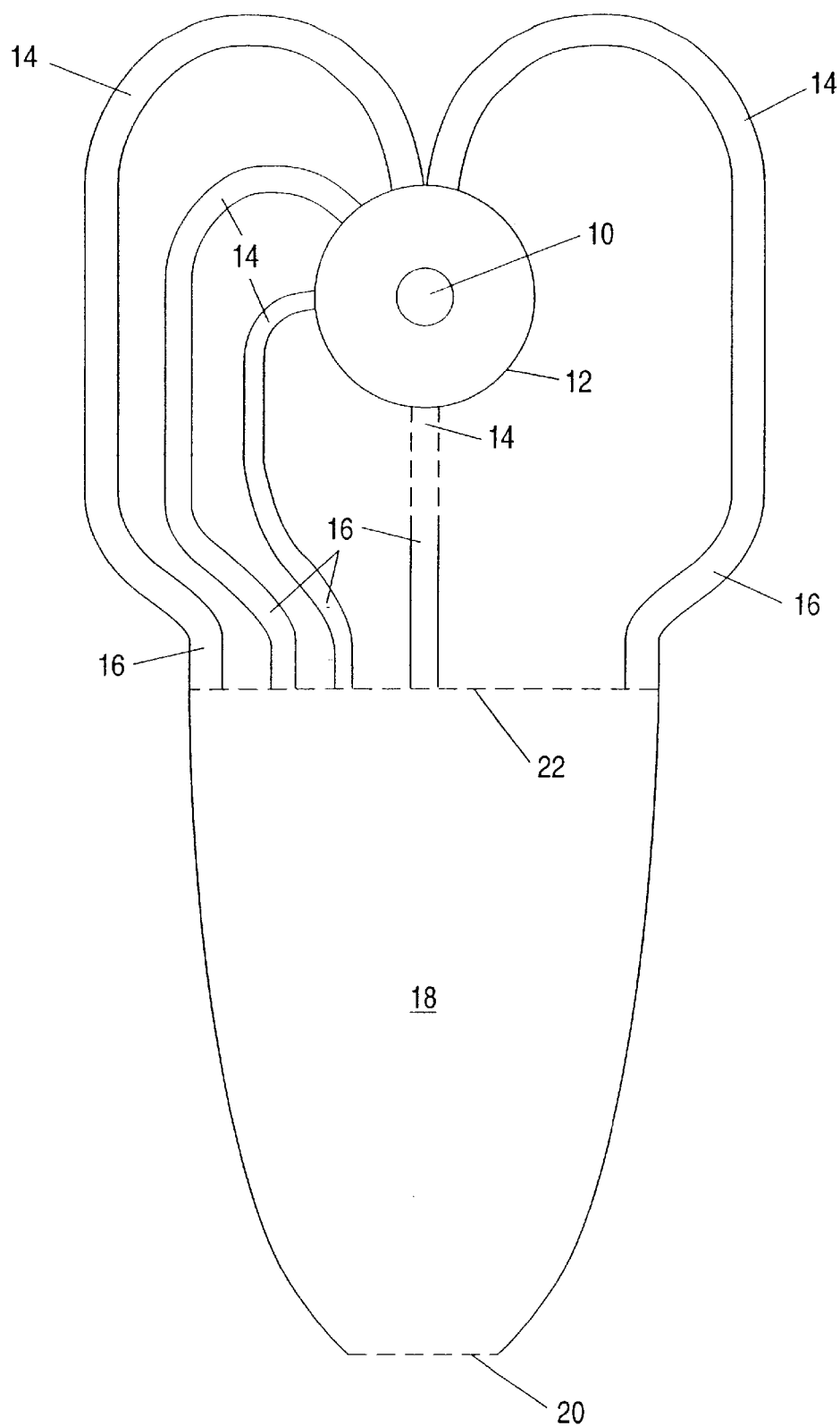
FIG. 1 is a schematic illustration of a reference embodiment of the present invention.
Figure 2A:
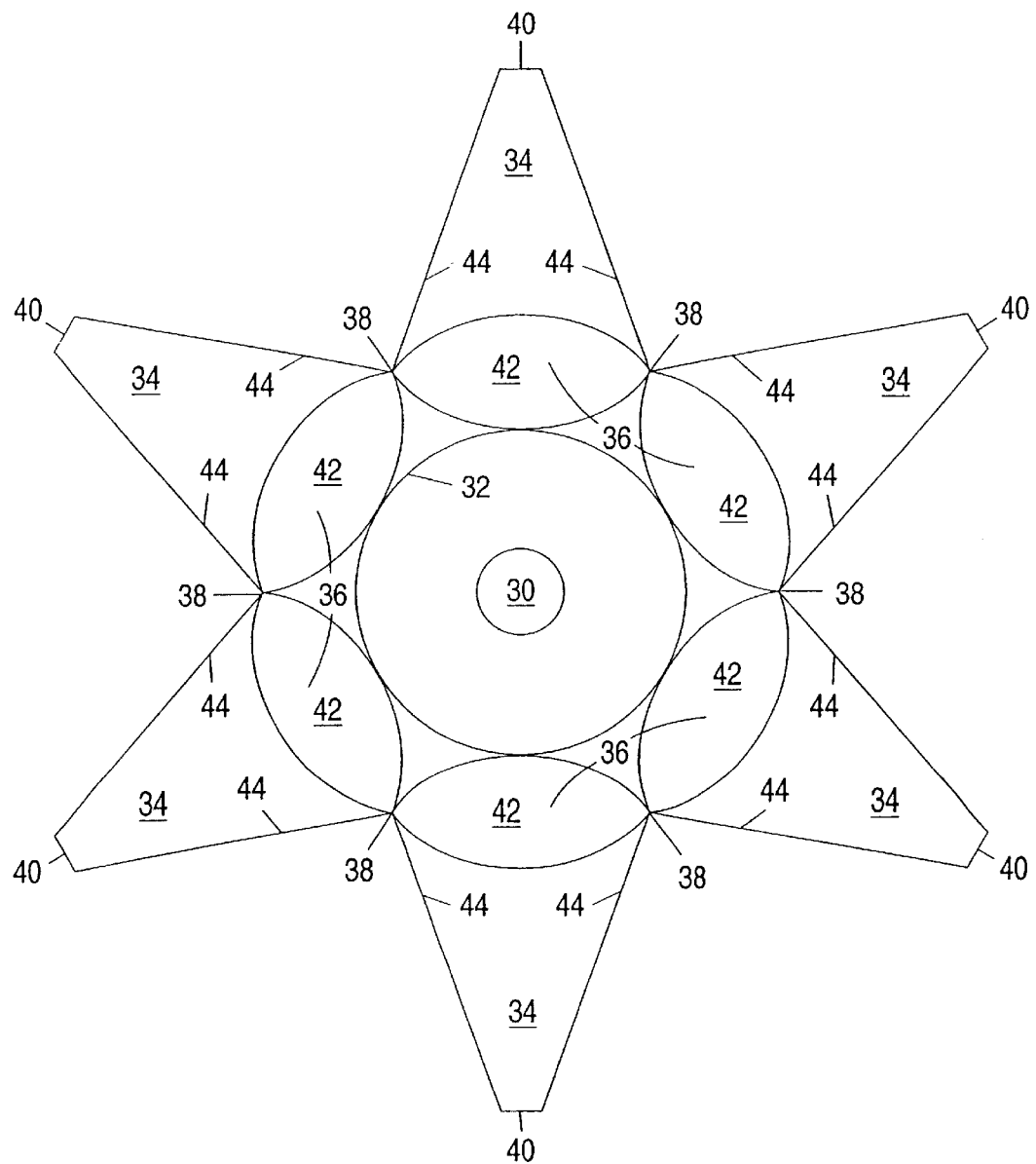
FIG. 2A is a schematic cross section of a preferred embodiment of the present invention with an elongated source.

Referring now to the drawings, FIG. 2A is a schematic partial cross section through a preferred embodiment of the system of the present invention. A source 30 of the elongated type is surrounded concentrically by a similarly elongated transparent envelope 32 which is in turn surrounded by a number N of similarly elongated identical symmetric non-imaging concentrators 34 positioned with entrance apertures 36 thereof facing source 30 and absorbers 40 thereof pointing away from source 30. Each entrance aperture 36 is occupied by a convex lens 42. Interior lateral sides 44 of concentrators 34 are reflective. Source 30 is Lambertian (emitting isotropically in position and direction) and has a radius r. Envelope 32 has a radius $R_0$ that is considerably greater than r. With edges 38 of entrance apertures 36 at a distance $R > R_0$ from the center of source 30. The width of each entrance aperture is $2R \sin(\pi/N)$, i.e., the length of a side of the regular polygon of N sides that is circumscribed by a circle of radius R. In the particular case illustrated in FIG. 2A, N=6 and R/r=6.

The objective of the present invention is to realize the maximum permissible concentration (sometimes referred to as the thermodynamic limit), where concentration is defined as the ratio of the area of entrance aperture 36 to the area of absorber 40 such that all incident rays are accepted (barring absorptive losses in the reflectors as well as absorptive and reflective losses from the lens). In this instance, maximum concentration means that the area of absorber 40 of each of the N concentrators 34 is $2\pi r/N$. This is equivalent to saying that the optical throughput from source 30 is conserved through the optical system of the present invention such that the area of absorber 40 assumes its minimal possible value, i.e., consistent with the thermodynamic limit to concentration. The maximum concentration C is then $$C = \frac{\text{entrance\_aperture}}{\text{absorber}} = \frac{2R\sin(\pi/N)}{\frac{2\pi r}{N}} = \frac{NR}{\pi r}\sin(\pi/N)$$

These observations are independent of the type of concentrator 34 used, i.e., whether it is comprised of lens-mirror combinations as illustrated, reflectors only, or dielectric only.

Due to the inherent concentration limits of imaging systems (W. T. Welford and R. Winston, *High Collection Nonimaging Optics*, Academic Press, San Diego (1989), pp. 3–6, 26–29), the present invention is based on the types of nonimaging solutions that have proven successful in reaching the thermodynamic limit to concentration in a host of other applications (Welford and Winston (1989), pp. 54–62, 77–86, 95–97, 99–108, 113–114). In the classic design of nonimaging concentrators for radiation sources at a finite distance, the source has usually been envisioned as larger than the concentrator entrance aperture. The analysis is not so simple when the source is smaller than the concentrator entrance aperture (which can be the case in the present invention), because if the number of concentrator units 34 is to be kept reasonably small, then the source arc length to which a single concentrator 34 is tailored is shorter than the width of concentrator entrance aperture 36.

A subtle consequence of this size discrepancy is that pure-reflector concentrators cannot achieve maximum concentration unless an exceedingly large number of units are introduced. To understand this point, consider the reversibility of maximum-concentration designs, in the sense of the interchangability of source and absorber. In any collector 34 that reaches the thermodynamic limit, an observer sitting on absorber 40 and looking outward must see radiation coming from all directions. In particular, entrance aperture 36 must be seen as completely filled by the radiation source. If a certain range of directions does not contain any radiation as seen from absorber 40, then the maximum concentration is diminished by the fraction this projected solid angle represents of the total.

Figure 2B:
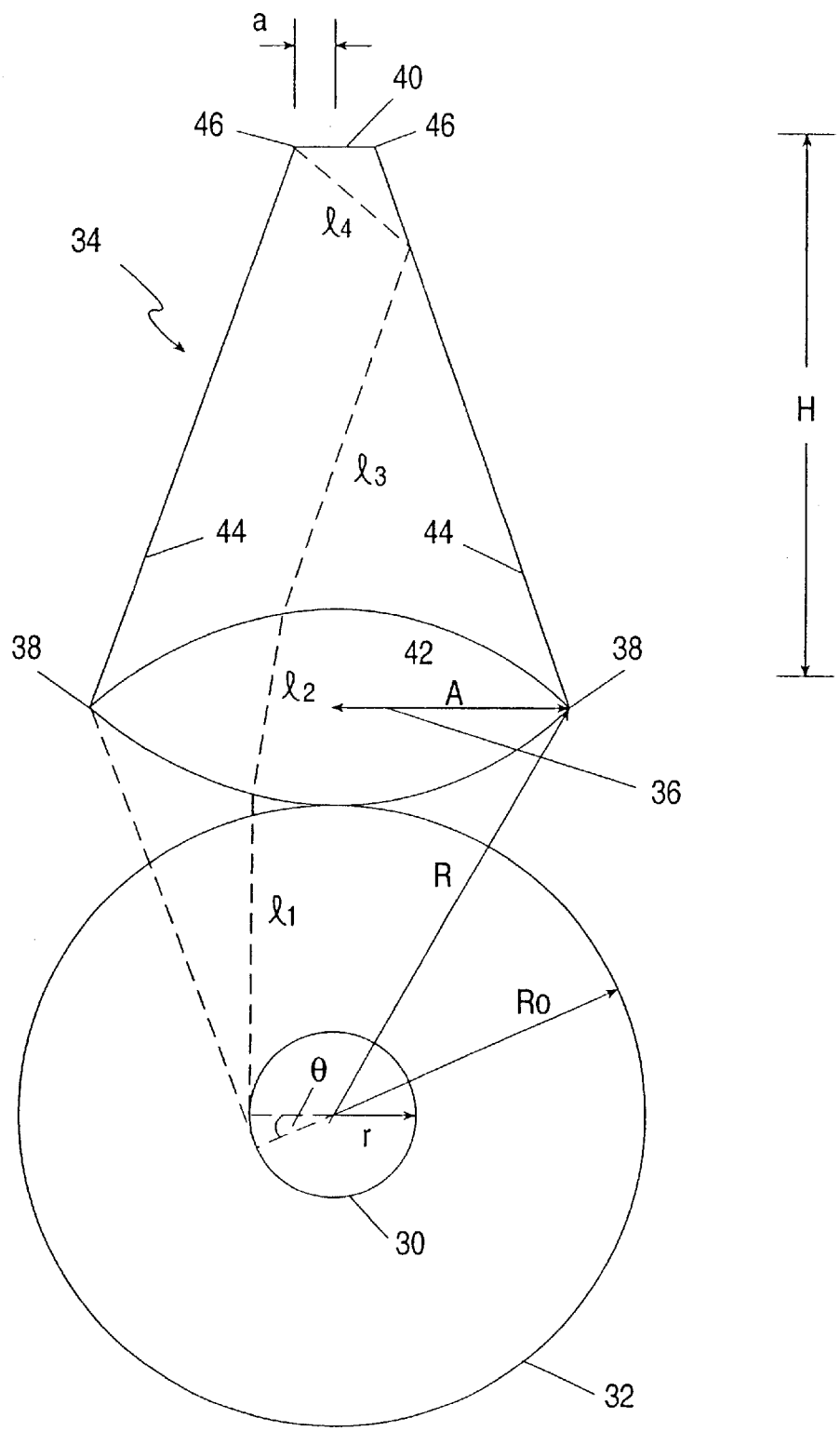
FIG. 2B illustrates the geometric design of the combined lens-mirror concentrators of FIG. 2A.

An approximate expression for this dilution of power density and the minimum number of concentrator units needed to avoid it is derived as follows. Referring to FIG. 2B, which illustrates the geometry of the problem of designing concentrator 34, the view factor $f_0$ for zero-reflection rays from absorber 40 of half-width α, to concentrator entrance aperture 36 of half-width A, in concentrator 34 with mirror height (depth) H, is approximately $$f_0 = \frac{A}{\sqrt{A^2 + H^2}} \qquad (H, A \gg a)$$

The view factor $f_1$ for these same zero-reflection rays from absorber 40 to source 30 only is approximately $$f_1 = \frac{r}{H + R\cos(\pi/N)} \qquad (H, R \gg a)$$

Consequently, maximum concentration is reduced (maximum attainable power density is diluted) by the factor $1-(f_0-f_1)$.

If N is sufficiently large, then no power density dilution need occur. In this limit, pure-reflector solutions without power-density dilution are feasible. By equating $f_0=f_1$ and requiring a certain concentrator depth, the minimum number of concentrator units can be estimated. For example, with R/r=6, in order to limit the depth of concentrator 34 to only 5 times the width of entrance aperture 36, approximately 50 collector units are required. The required number of collectors can be reduced to a minimum of around 20 at this value of R/r, but at the expense of inordinately deep units. Because of the complexity, unwieldy nature and/or high absorptive losses with such configurations, the present invention preferably is based on a practical solution that permits a small number of compact concentrator units 34.

The solution of the present invention derives from a combination of imaging and nonimaging elements. The power dilution problem can be remedied completely with a lens-mirror design, wherein a conventional converging cylindrical lens 42 is placed at concentrator entrance aperture 36, and reflector 44 is shaped according to the edge-ray principle of nonimaging optics (H. Ries and A. Rabl, "Edge-ray principle of nonimaging optics", *Journal of the Optical Society of America A* 1, 2627–2632 (1994)) such that, in the elongated designs, all rays are accepted and absorber 40 is the smallest commensurate with the thermodynamic limit. (A second related possibility is an all-dielectric lens-profile concentrator, which is addressed below. The present analysis is of the lens-mirror design only.)

Specifically, in FIG. 2B, each ray emitted tangent to the source, traversing converging lens 42 and striking reflector 44, is required to be reflected to the opposite absorber edge 46 after a single reflection. Each reflector point is determined by the requirement that the optical path length of each edge ray be constant. For an edge ray that strikes lens 42 from an arbitrary point on the surface of source 30, this translates to the condition:

$$r\theta + l_1 + nl_2 + l_3 + l_4 = \text{constant}$$

where n is the refractive index of lens 42, the path lengths $l_1$, $l_2$, $l_3$ and $l_4$ are indicated in FIG. 2B, and the angle θ indicates the path length along the circular arc of source 30 relative to its initial value (θ=0) for the tangent from source 30 to concentrator aperture edge 38.

The constant in the above equation can be determined from the initial edge ray in the construction, that strikes entrance aperture extreme point 38, in which case: $l_1$ follows from simple geometry; $l_2=0$; $l_3$ follows from the reflector depth H chosen; and $l_4$ is the width of absorber 40 (which is 2πr/N). By symmetry, reflectors 44 are each others mirror images.

The present illustration is for a lens of zero thickness at its edges. The construction procedure applies equally well to a lens of finite edge thickness, the only difference being that $l_2$ for the extreme rays striking lens edges 38 will be non-zero, and all path lengths through the lens will be increased.

Mirror 44 cannot be made arbitrarily shallow. Admissible solutions correspond to the caustic of edge rays refracted through the lens falling behind reflector 44 (rather than inside concentrator 34 between reflector 44 and lens 42). When this caustic moves from outside to inside concentrator 34, the design criterion cannot be satisfied at all points along reflector 44, and ray rejection ensues.

The design strategy of the present invention insures that all intermediate rays are accepted, and that maximum concentration is achieved. Lens 42 should have a focal length not exceeding R in order to form a real image of the source on the concentrator side of lens 42. Lens 42 should reduce the size of the perceived source and increase its angle so that nonimaging concentrator 34 can be compact.

The smaller the number N of concentrator units 34, the lower the $f$-number (ratio of focal length to diameter) of lens 42 becomes. For example, for a lens focal length equal to κR (κ<1), $$f - \text{number} = \frac{k}{2\sin(\pi/N)}$$

so in FIG. 2A with N=6, lenses 42 would have $f$-numbers less than 1. The practical tradeoff in reducing N is that whereas the mirror assembly for fewer concentrator units may be easier to fabricate and more compact, it necessitates thicker more strongly converging lenses that are more difficult to produce.

It turns out that for a given value of R/r, there is one particular combination of lens focal length and mirror depth for which mirrors 44 are well approximated by straight lines (a truncated V-trough), namely, when absorber 40 is part of the image of source 30 produced by lens 42. Flat mirrors are far easier to manufacture and obtain than curved mirrors, as well as being considerably less expensive.

The maximum-concentration design will distribute concentrated rays on absorber 40 over an exit angular range of $2\theta_{out}=\pi$. Should a restricted exit angle ($\theta_{out}<\pi/2$) be required, reflector design can be modified accordingly, and concentration is reduced by a factor of $\sin(\theta_{out})$. Restricted exit angles might be desirable to account for the path lengths (and associated absorption losses) of high-angle rays through the light channels that deliver radiation from the absorber plane to the remote target. In addition, most absorbers 40 exhibit higher reflectivity at large incidence angles.

Absorber 40 is a flat rectangular slat, in which optical fibers or lightpipes of high transmissivity are placed. It also is assumed that the light channel numerical aperture is large enough to accommodate all rays that emerge from the concentrator absorber plane. The reason for introducing light transport is: (1) to eliminate the rigidity of requiring the target (i.e., the application) to be situated in one particular site, at one specific orientation; and (2) to permit almost all emitted power to be delivered to a single target at maximum power density and maximum radiative efficiency. This remote irradiation option is desirable for a number of reasons related to cooling systems, ease of use, aiming, the possibility of dividing the emergent flux into autonomous and possibly differently-shaped units, and the simple operational flexibility of a mechanical de-coupling of source and target.

Absorber packing losses must be considered. In one embodiment of the present invention, a short run of clad fiber tips are stripped and fused together so as to generate a flat rectangular absorber. Close-packed circular fiber tips incur packing losses of about 10%. Whether avoidance of this loss merits the added production difficulty is case-specific.

Concentrator design in the orthogonal (transverse) plane calls for flat vertical mirrors placed at the transverse ends of the trough assembly, to minimize lost rays and hence maximize radiative efficiency.

Figure 3:
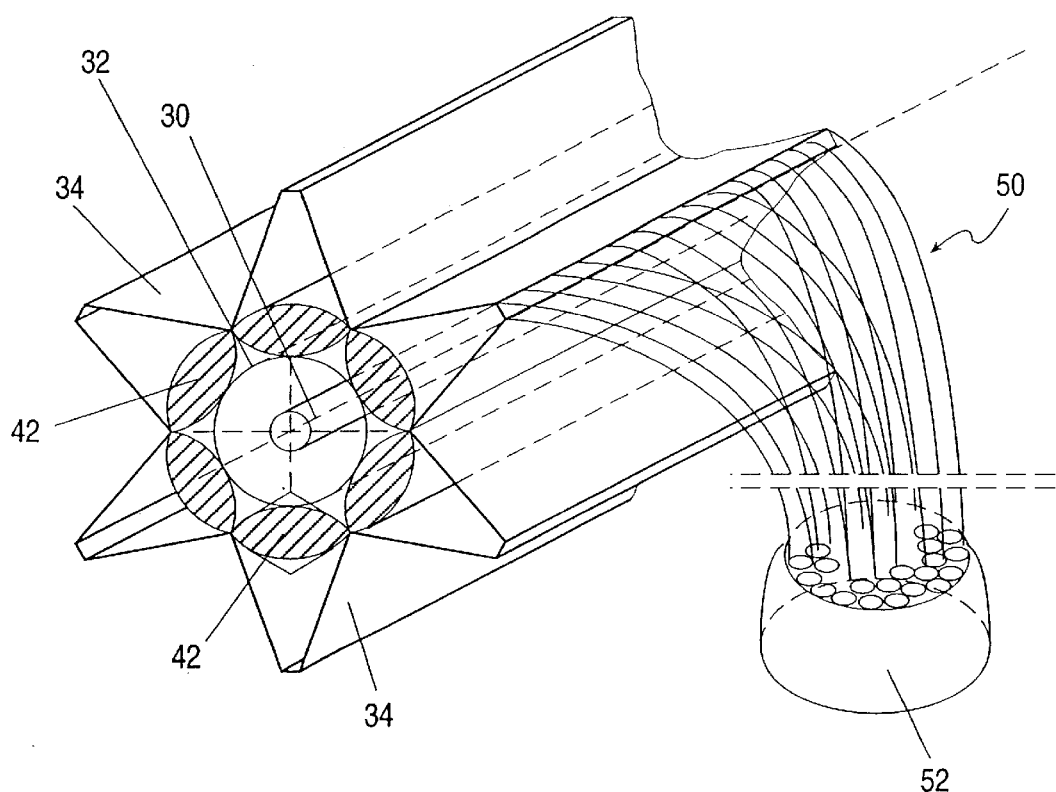
FIG. 3 is a schematic perspective depiction of remote delivery of light from the embodiment of FIG. 2A.

At the remote end of light channels, the light can be delivered from conveniently-shaped luminaires to the remote target. Bundles of light channels 50 can be grouped into circles or rectangles (or any convenient geometry) to form a near-Lambertian light source about which nonimaging mirrors 52 can be tailored to required angular and flux distributions, as shown schematically in FIG. 3. For example, a number of Compound Parabolic Concentrators are used when sharp angular cutoffs are critical; and Tailored Edge-ray Devices are used when precisely uniform flux is essential (R. Winston and H. Ries, "Nonimaging reflectors as functionals of the desired irradiance", *Journal of the Optical Society of America A* 10, 1902–1908 (1993); A. Rabl and J. M. Gordon, "Reflector design for illumination with extended sources: the basic solutions", *Applied Optics* 33, 6012–6021 (1994); H. Ries and R. Winston, "Tailored edge-ray reflectors for illumination", *Journal of the Optical Society of America A* 11, 1260–1264 (1994); P. T. Ong, J. M. Gordon and A. Rabl, "Tailored edge-ray designs for illumination with tubular sources", *Applied Optics* 35, 4361–4371 (1996)).

As one illustrative example, consider the configuration of FIG. 2A with N=6, a single lamp of power P, source length L, a source radius of unit length and R=6 (note that R is the distance from the source center to the lens edge). Consider, for example, halogen filament lamps or metal-halide lamps where r<<L. The source power density is $P/(2\pi rL)$. Flat vertical end mirrors are inserted orthogonal to the filament at the planes demarcated by the filament ends. Provided r<<L, no more than a few percent of the emitted power is lost laterally along the filament axis through the holes in the flat vertical end mirrors.

Hence, each concentrator entrance aperture 40 would have a width of 6, a length L, and would intercept a radiative power close to P/6. Each of the six absorbers 40 would then have length L and width 1.05 (provided $\theta$out can be $\pi/2$). The geometric concentration ratio would be 5.7.

For reflectors with a specular reflectivity of about 95–98% over the spectrum of the lamp, with the reflector assembly incurring around one reflection on average, and with realistic lens losses of around 10%, at least 0.85(P/6) would reach each absorber 40. With light channel 50 transmissivities of better than 90% per linear meter, radiation can be delivered remotely at a power density of 75% of the source value, from an absorber area that can approach that of the source itself.

The design problem is more challenging for compact sources, such as spherical radiators and ellipsoid discharge regions. The 2D symmetry of the long-source lamp cannot be exploited. Therefore an alternative approach is developed. The notion of multiple concentrators is retained, but for simplicity, only identical concentrator units are considered herein; although the scope of the present invention includes non-identical concentrator units.

Figure 4B:
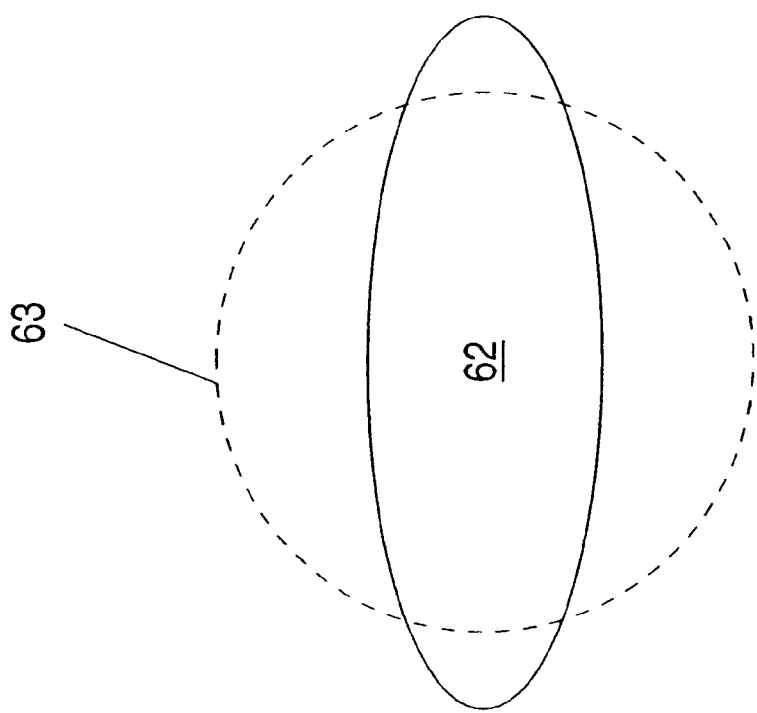
FIG. 4B is a cross sectional illustration of the virtual spherical source corresponding to an actual ellipsoidal source.
Figure 4A:
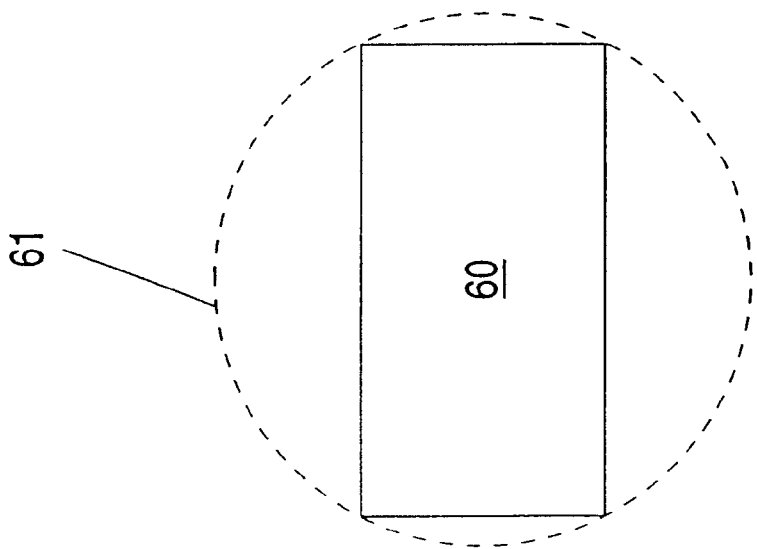
FIG. 4A is a cross sectional illustration of the virtual spherical source corresponding to an actual cylindrical source.

Each concentrator is designed for that part of the spherical source that is perceived at the concentrator entrance aperture. In the cases of the microwave sulfur source and some discharge lamps, the source is indeed spherical. In the case of a squat cylindrical arc 60 or an ellipsoid-shaped arc 62, as illustrated in FIGS. 4A and 4B, the design is for the smallest virtual sphere 61 or 63 circumscribed about the actual discharge region such that all rays are accommodated. This latter case dictates a reduction in the attainable power density, which will be quantified below.

The designs for compact sources, according to the present invention, are lens-mirror profiles, designed for the corresponding extended source problem and then rotated about their optic axes. Hence the same type of design is used as described above in connection with FIGS. 2A and 2B, wherein extended source 30 appears in cross section as a circular arc. The lens-reflector combination is designed such that extreme rays (tangents) from the circular arc that strike the lens are brought to the opposite absorber edge after one reflection off the reflector.

If disc concentrator entrance apertures were used to tile a spherical surface of radius R concentric with the source, at least 10% of the emitted rays would miss the concentrators due to imperfect tiling of a spherical surface by circles. This packing loss increases with concentrator entrance aperture diameter, i.e., the loss worsens as one designs for fewer concentrator units.

Figure 5:
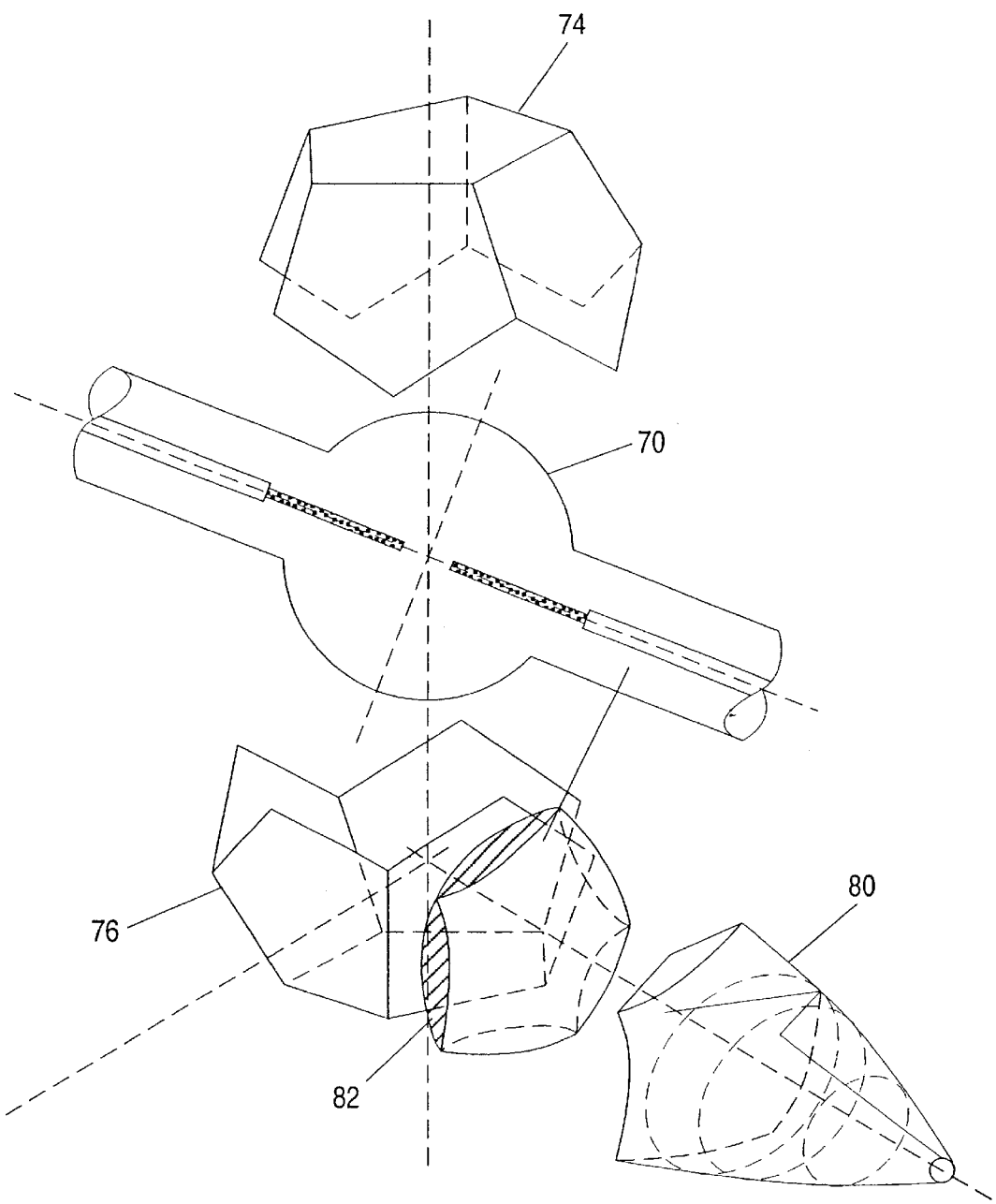
FIG. 5 is a partial schematic perspective illustration of a preferred embodiment of the present invention with a compact source.

To intercept all emitted rays with a surface comprised of one shape only, the present invention most preferably uses a concentrator unit pattern based on the five classic Platonic solids. This concept is illustrated schematically in FIG. 5, which is a partial exploded perspective view of a gas discharge lamp 70 enclosed by a top half 74 and a bottom half 76 of a dodecahedron. One pentagonal face 76 of the dodecahedron is occupied by a pentagonal convex lens 82 that also occupies the entrance aperture of a concentrator unit 80. To minimize skew-ray rejection, each concentrator unit 80 has its tapered profile changed from its regular polygonal form at the entrance aperture to a rotationally-symmetric cone-like profile within a relatively short distance from its entrance aperture. Hence an additional constraint is the mismatch in shape between the polygonal entrance aperture and the (fictitious) circular entrance aperture circumscribed about it. The circumscribed disc is fictitious because neighboring concentrators 80 would overlap and exclude part of one another's collecting area. The minimum loss stemming from this geometric mismatch occurs for the polygonal entrance aperture with the largest number of sides, i.e., for which the largest fraction of the area of the circumscribed disc is occupied by the polygon. Of all five Platonic solids, the best candidate is the dodecahedron - a surface comprised of 12 identical regular pentagons, which is indeed the example illustrated in FIG. 5.

Because lamp 70 is enclosed in the concentrator assembly, the configuration must be readily manufactured and assembled. For example, the concentrator must be easy to open for lamp replacement and maintenance, as well as containing a minimum number of separable components. For this reason, the dodecahedral enclosure is constructed in two identical separable halves 74 and 76.

In the modification of the elongated source design exercise by which the cross-section of each compact source concentrator unit is generated, the dodecahedral geometry requires that a concentrator unit be designed with an entrance aperture of 0.6071R. This corresponds to an equivalent N value of 4.81. Because the concentrator axes do not lie in a plane, N need not be an integer. For a particular combination of lens focal length and concentrator depth, the reflector is well approximated by a truncated V-cone, which is the simplest and most affordable 3D mirror.

Figure 6:
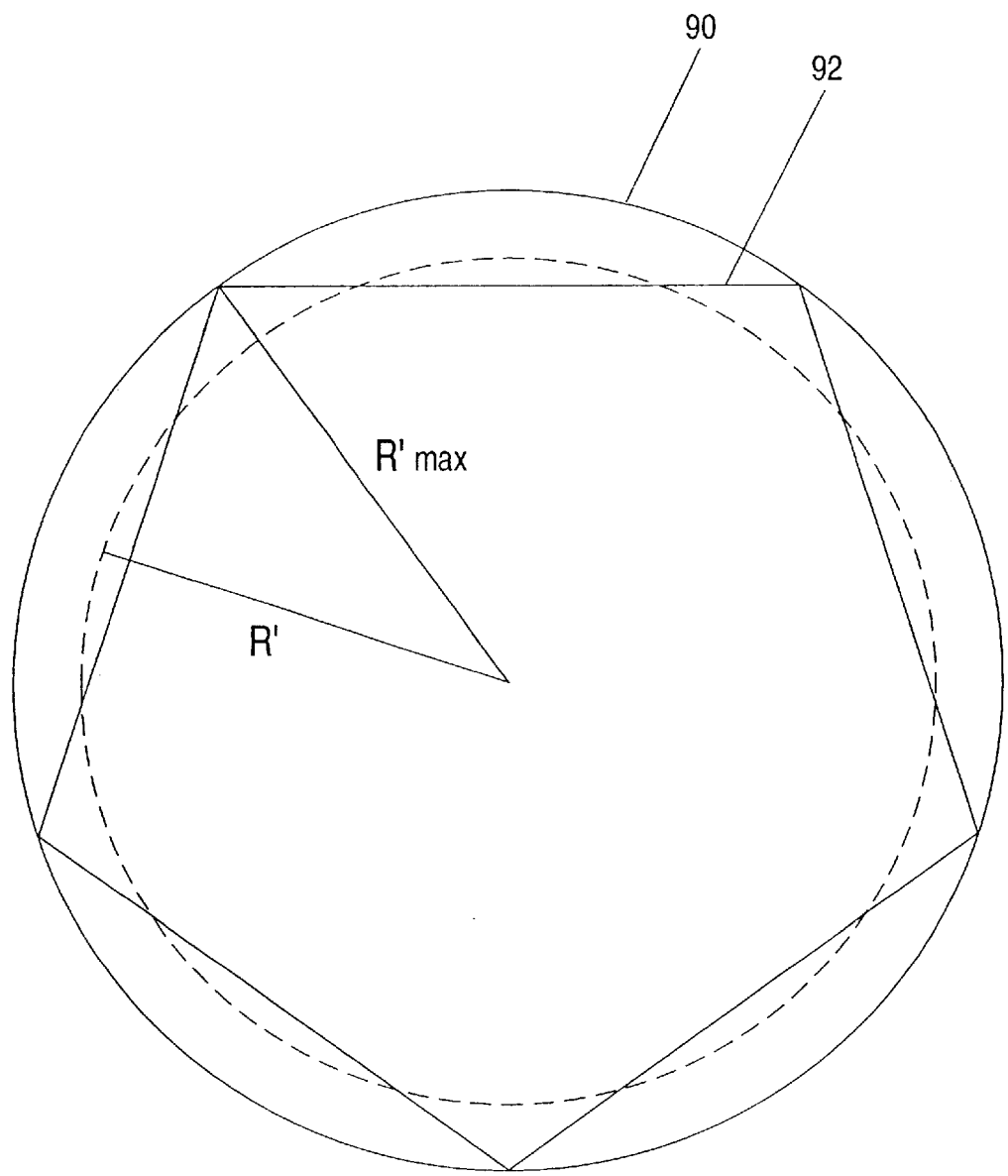
FIG. 6 illustrates the geometric design of the pentagonal apertures of FIG. 5.
Figure 7:
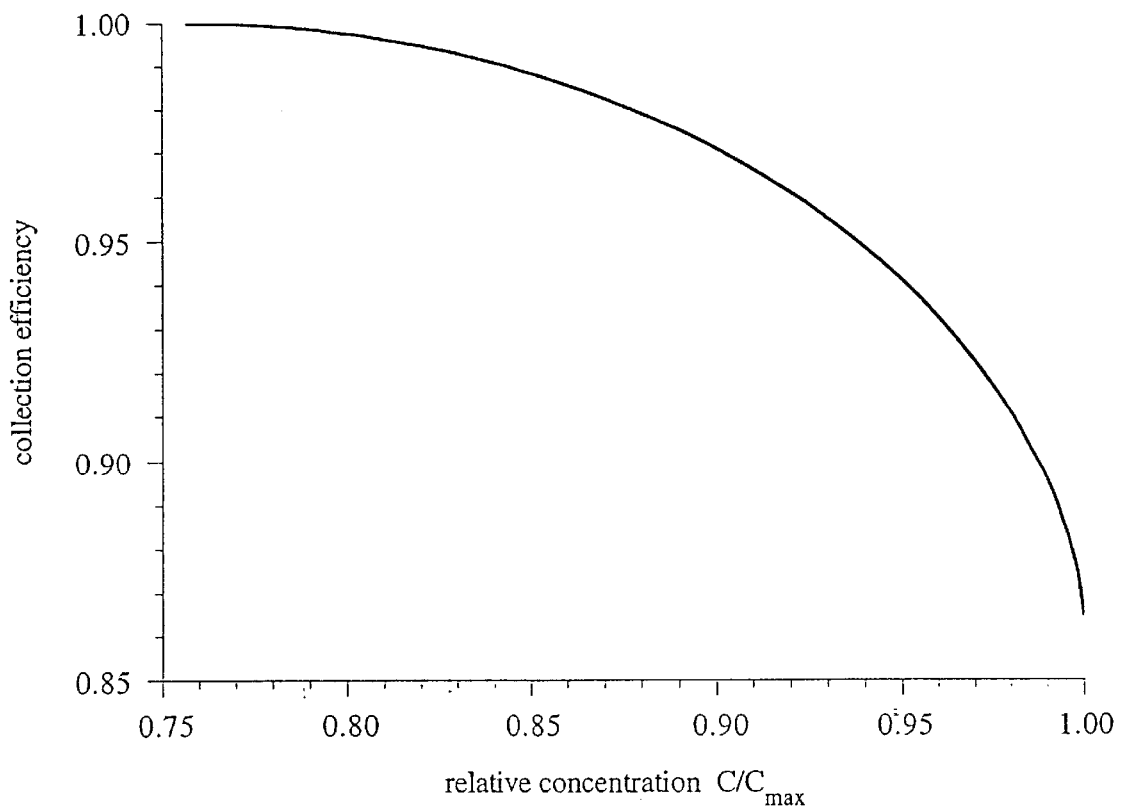
FIG. 7 is a plot of collection efficiency vs. relative concentration for the embodiment of FIG. 5.

Because adjacent apertures eclipse one another, the best balance between collection efficiency and concentration relative to the thermodynamic limit $C/C_{MAX}$ must be chosen. By designing for a concentrator entrance aperture disc 90 that is circumscribed about the actual pentagonal entrance aperture 92, as shown in FIG. 6, no ray rejection is incurred due the geometric mismatch. This is the limit of maximum collection efficiency. However, power density then is compromised ($C/C_{MAX}$) by requiring an absorber that is larger than the minimum size corresponding to the thermodynamic limit. By designing for an entrance aperture disc that is inscribed within pentagonal aperture 92, maximum concentration is obtained, but at reduced collection efficiency. The calculation of this tradeoff is a straightforward geometric exercise, the result of which (given parametrically in the following equations) is plotted in FIG. 7.

$$C/C_{MAX} = 1 - \left\{ \frac{5}{\pi} [\beta - \sin\beta\cos\beta] \right\}$$

$$\text{collection efficiency} = \frac{\sin\beta + \frac{\frac{\pi}{5} - \beta}{\cos\beta}}{\tan(\pi/5)\cos\beta}$$

where $$\cos\beta = \frac{\cos(\pi/5)}{R'/R'_{MAX}} \quad 1 \geq R'/R'_{MAX} \geq \cos(\pi/5)$$

Attainable power density must inherently be compromised in the compact source designs, beyond the considerations noted above. Two factors are responsible.

(1) Skewness conservation requires additional skew-ray rejection because of the geometric mismatch between the spherical cap source (actually, the rotated 2D circular arc) for which the design is performed, and the disc absorber. Skew-ray rejection then depends on the power density dilution selected, or, equivalently, on the choice of $R'/R'_{MAX}$ in FIG. 6.

(2) The reduction in power density inherent in the present design strategy is substantially greater when the actual source is non-spherical, such as an ellipsoidal discharge region. Consider the nominal worst case of a cylindrical source of diameter d and length L radiating from its circumferential area (i.e., radiation from the two disc ends of the cylinder is ignored). The fraction of the circumscribed virtual spherical source (for which the present design is performed, as drawn in FIGS. 4A and 4B) represented by the actual source is $Ld/(L^2+d^2)$. In the best instance when d=L, this ratio reaches its maximum value of 0.5. Namely, in order to accommodate all emitted rays, the power density must be reduced (i.e., the size of the absorber must be increased) by a factor of 2. Fortunately, when d/L is small, the maximum-flux elongated source designs delineated above are applicable, and hence the severe limitation of these compact source designs is avoided.

The concentrator units may not receive identical flux for two reasons. First, lamp ballasts or connectors block a small fraction of radiation from being emitted along the axis of the arc discharge (or render its collection impractical). Second, the discharge arc may not be spherically symmetric.

As an illustrative example, consider a lamp of power P. Each regular pentagonal concentrator entrance aperture intercepts a radiative power of P/12. Referring to the incremental ray rejection and the dilution of power density that stem from the geometric mismatch between the actual pentagonal aperture and the design disc aperture, a compromise design point is selected in FIG. 7 with 6% additional ray rejection and 6% power density dilution.

In the remote irradiation scenario of the present invention, total system optical losses are around 40%, accounted for as follows. (1) About 10% absorption losses in the optical fibers or lightpipes that have roughly 90% transmissivity. (2) Absorptive and reflective lens losses of around 10%. (3) Around 5% absorption in specular mirrors that have roughly 95% reflectivity and incur one reflection on average. (4) The 6% ray rejection noted above (see FIG. 7) plus the skew-ray rejection of about 17% as detailed above.

If the concentrator exit angle is restricted, with the object of eliminating large-angle emissions into the light channels, then an additional dilution of power density of about 10% is introduced (at no loss of radiative efficiency but rather by oversizing the absorber). The present invention therefore gives a throughput from lamp to remote target of about 0.6 P, onto an absorber area that is about 10% larger than that of the source. In other words, the system of the present invention delivers remote irradiation at a power density that is more than half that of the source.

Optical fibers and lightpipes are commercially available for the visible and infrared (as well as ultraviolet) spectra of applications of the present invention, such that attenuation of 10% or less, per linear meter, is obtainable. These optical fibers and lightpipes can transport the concentrated flux to the remote application, and can be re-grouped geometrically to form light sources of almost any convenient shape for delivery to the task. At the delivery end, a short run of cladding is stripped and fiber tips are fused into any desired shape. In addition, radiation that is delivered to light channels of uniform cross section over a particular angular range emerges with the same angular distribution (except for differences in absorptivity at each angle due to different optical path lengths through the light channel). Hence a nominally Lambertian absorber at the channel input results in an effectively Lambertian light source at its output.

Precisely because of the high source power densities of conventional lamps, the nonimaging systems of the present invention are particularly suited to applications in industrial heating and certain medical applications. The attainable elevated power densities are suited to medical procedures such as tissue welding, coagulation, external skin disorders, and cosmetic surgery, among others.

Even applications in which nominally monochromatic radiation is required (such as photodynamic therapy) are amenable to the present invention. Certain conventional lamps emit over a narrow band of wavelengths, or have strong emissions at wavelengths of surgical (or other) interest. If the lamp's power density over the pertinent wavelength range is sufficient to the task, then the nonimaging concentrator assembly of the present invention is suitable for remote light delivery.

Figure 8:
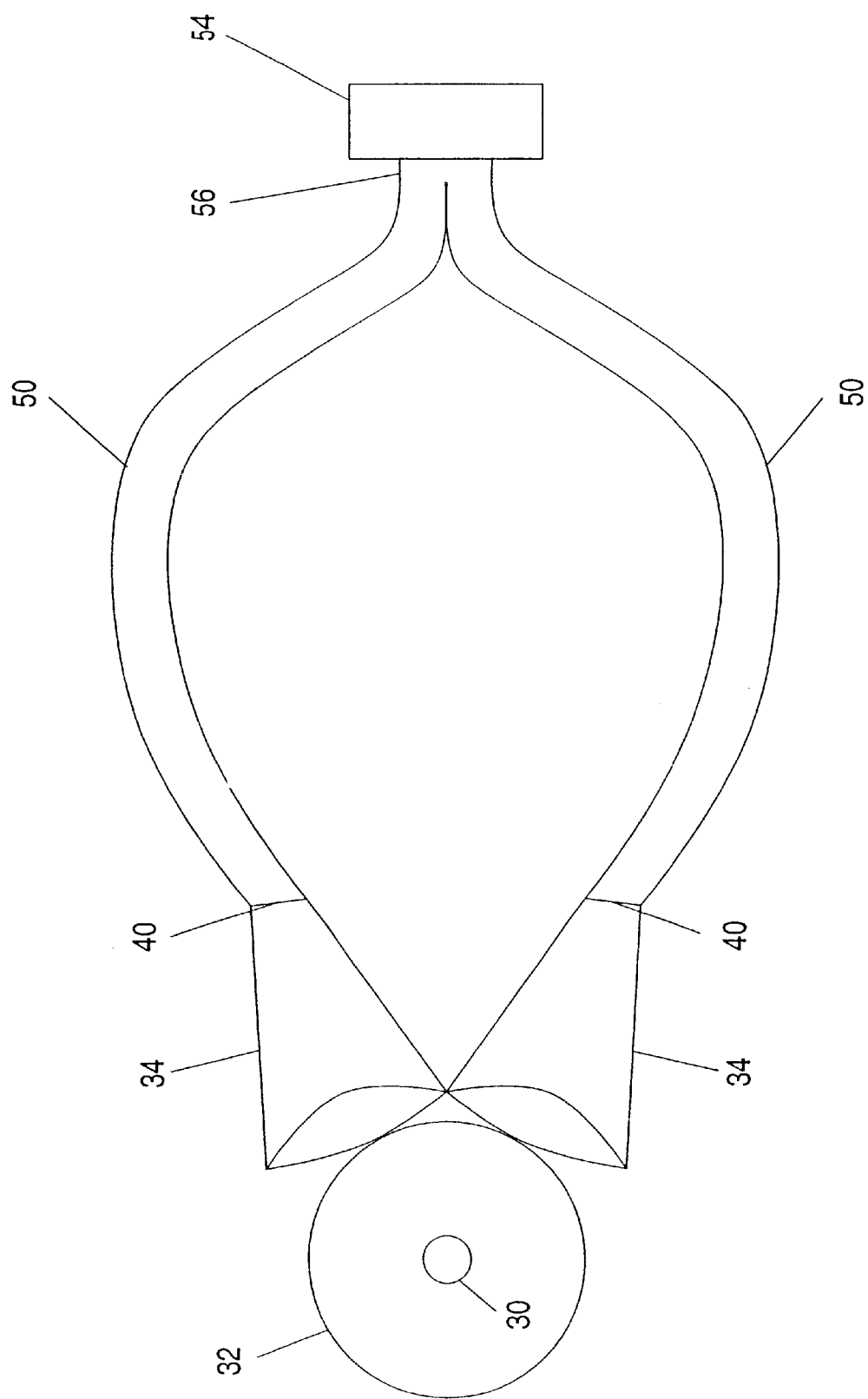
FIG. 8 is a schematic illustration of the use of the present invention with a monochromator.

The high-efficiency high-brightness optical systems of the present invention are uniquely well-suited to the use of a narrow-wavelength radiation filter for the purpose of markedly reducing the power of the light source for a given intensity of light over a narrow window of wavelength. This is illustrated schematically in FIG. 8, in which, for simplicity, only two nonimaging concentrators 34 are shown adjacent to envelope 32. A nonabsorbing monochromator, such as a spectral filter 54 with high transmissivity in the wavelength window of interest, and high reflectivity at all other wavelengths, is placed at the exit 56 of an optical system of the present invention. With conventional optical designs, most of the light reflected back toward the light source misses the source, and hence is rapidly dissipated. The present invention insures that nearly all of the radiation reflected by filter 54, and not absorbed in the mirrors and lenses, reaches the radiating region of source 30. The re-absorbed radiation results in a reduced electrical input power requirement for the lamp at fixed effective color or blackbody temperature, while recognizing that the effective gray-body emissivity of conventional lamps is substantially below 100%. The smaller the lamp's effective emissivity, the greater the potential savings in input power. Namely, the same light intensity within the prescribed wavelength window that is available in the absence of selective filter 54 is achievable at substantially reduced power requirement in the lamp.

Although the preferred mode of using monochromator 54 in conjunction with the present invention is by placing a single monochromator 54 is at exit 56, as shown, it will be appreciated that, alternatively, one monochromator 54 per concentrator 34 can be placed adjacent to each absorber 40, between absorbers 40 and the corresponding light channel 50. This alternative configuration slightly decreases the optical losses in light channels 50, at the expense of having to use as many monochromators 54 as there are concentrators 34.

Suppose optical fibers are used to extract and transport the concentrated light. Because the light emerging from the fiber is distributed over a large angular range, it is already well suited to certain surgical procedures where volumes of tissue need to be irradiated (Abraham Katzir, *Lasers and Optical Fibers in Medicine*, Academic Press, San Diego (1993), pp. 10–12, 134–135, 186–188, 212–219, 222–230, 247–252, 254–258, 262–266, 269–284). In applications in which a far narrower field of emission is essential, one of a variety of compact nonimaging devices developed for optical fibers can be placed on the tip of the fiber to collimate the radiation at maximum radiative efficiency.

In semiconductor processing, temperatures in the range of 1000–1600 K are common in the physio-chemical treatment of silicon wafers. This is just one of a host of industrial processing examples to which the present invention is suited. Inefficient optical designs with quartz-halogen lamps are common, leading to practical problems with electrical supplies, cooling systems, surrounding material degradation, and system size, not to mention the need to place an infrared unit emitting dozens of kilowatts atop a small reaction chamber. The combination of high-power density radiation delivered remotely obviates most of these problems. The remote irradiation concept is doubly attractive because of the critical nature of uniform flux on the target. Rather than being constrained by the particular luminaires placed around the lamp(s), the lighting power is produced remotely, the light channels are re-grouped, and nonimaging reflectors tailored to the illuminance distribution needs of the process are placed at the reaction chamber.

The lens-mirror design developed above is equally well applied to an all-dielectric lens-profile concentrator, for both elongated source and compact source devices. The nonimaging maximum-concentration lens-profile notion was first proposed by X. Ning, R. Winston and J. O'Gallagher ("Dielectric totally internally reflecting concentrators", *Applied Optics* 26, 300–305 (1987)). In the present case, the entrance cap (lens) has cylindrical (elongated source) or spherical (compact source) curvature, and the side profiles are tailored so as to satisfy the same edge-ray strategy as delineated above. In addition, all points along the profile must satisfy total internal reflection. The designs of the present invention specifically accommodate a finite-size source at a finite distance. In terms of absorptive losses, those due to the imperfect reflectivity of mirrors are traded for absorption in the dielectric.

The all-dielectric concentrator is particularly attractive when optical fibers (as opposed to light pipes) are used in the remote irradiation scheme. Concentration is increased by a factor of $n_m$ or $n_m^2$ for the elongated source or compact source units, respectively, where nn is the smaller of the refractive indices of the optical fiber or concentrator dielectric. This means that absorber width or diameter is reduced by a factor of $n_m$, without compromising the high collection efficiency. One particular combination of lens curvature and profile depth yields a straight-line profile in 2D cross-section. This is especially well suited to realistic fabrication methods.

Figure 9:
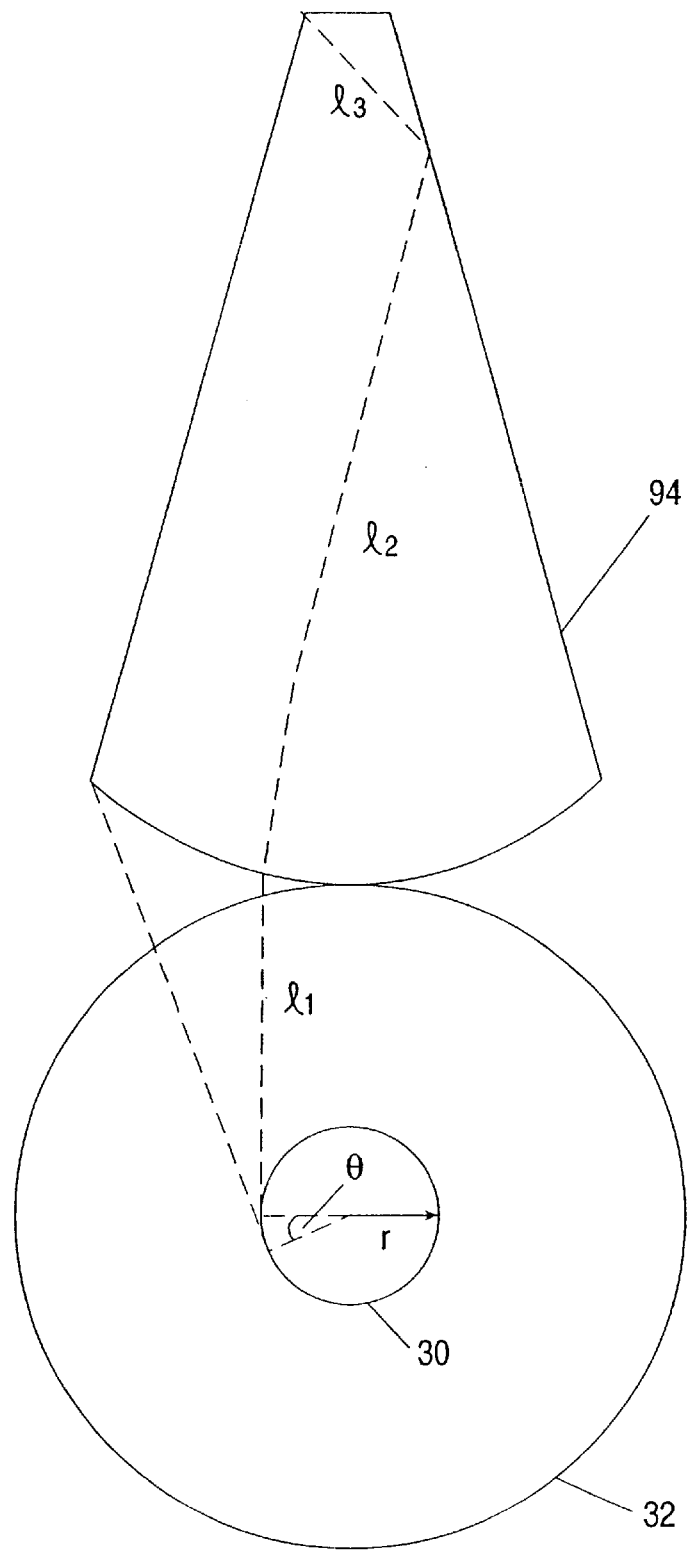
FIG. 9 illustrates the geometric design of a dielectric concentrator.

Concentrator geometry again is based on the method of constant optical path length for edge rays, as illustrated in FIG. 9, which is analogous to FIG. 2B, with hollow lens-mirror concentrator 34 replaced by a solid dielectric concentrator 94. In FIG. 9, where for specificity the refractive indices of the concentrator dielectric and the absorber have been taken as equal with n=1.5, it is required that $$r\theta + l_1 + n(l_2 + l_3) = \text{constant}$$

Relative absorber 40 of concentrator 34, the absorber diameter of concentrator 94 is reduced by a factor of n, to $2\pi r/(N\,n)$.

The compactness of the concentrators of the present invention can be improved by using aspheric lenses. Concentrator contours are obtained using the recently-developed tailored edge-ray formalism (J. C. Minano and J. C. Gonzalez, "New method of design of nonimaging concentrators", *Applied Optics* 31, 3051–3060 (1992); J. C. Mifiano, J. C. Gonzalez and P. Benitez, "A high-gain, compact, nonimaging concentrator: RXI", *Applied Optics* 34, 7850–7856 (1995); R. P. Friedman and J. M. Gordon, "New optical designs for ultra-high flux infrared and solar energy collection: monolithic dielectric tailored edge-ray concentrators", *Applied Optics* 35, 6684–6691 (1996)) and are calculated with the method of constant optical path length.

Chromatic aberrations give rise to ray rejection. The optical design of the present invention relates to a particular wavelength of the radiation, while a broad spectrum must be accommodated. Fortunately, for the angles that correspond to realistic practical lamps and concentrator configurations, and for common lens materials in the visible and infrared, chromatic aberration losses are of the order of 1%. Therefore they are not explicitly accounted for here. Recall that whereas chromatic aberrations may exert a noticeable effect on image quality, their impact on concentration is negligible especially when nonimaging design strategies are employed.

While the invention has been described with respect to a limited number of embodiments, it will be appreciated that many variations, modifications and other applications of the invention may be made.

What is claimed is:

1. A system for delivery of high intensity light to a target, comprising:

(a) a source of the high intensity light; and (b) a plurality of nonimaging concentrators surrounding at least a portion of said source and distributed around said source in a pattern based on a Platonic solid, each of said nonimaging concentrators having an entrance aperture, all of said entrance apertures facing said source.

2. The system of claim 1, further comprising:
(c) a substantially transparent envelope enclosing said source; said nonimaging concentrators being outside of said envelope with said entrance apertures substantially adjacent to said envelope.

3. The system of claim 1, wherein said source is included in a lamp selected from the group consisting of metal-halide lamps, noble gas lamps, halogen lamps and microwave-sulfur lamps.

4. The system of claim 1, wherein said source and said nonimaging concentrators are elongated, said nonimaging concentrators being substantially parallel to said source.

5. The system of claim 1, wherein said Platonic solid is a dodecahedron.

6. The system of claim 1, wherein said nonimaging concentrators are selected from the group consisting of combined lens-mirror nonimaging concentrators and dielectric nonimaging concentrators.

7. The system of claim 1, wherein each of said nonimaging concentrators is shaped according to an edge-ray principle.

8. The system of claim 7, wherein said shape is substantially a truncated V-trough.

9. The system of claim 7, wherein said shape is substantially a truncated V-cone.

10. The system of claim 1, wherein each of said nonimaging concentrators has an absorber, the system further comprising:
(c) a mechanism, optically coupled to said absorbers, for conducting light emerging from said absorbers to the target.

11. The system of claim 10, wherein said mechanism includes at least one transmission channel selected from the group consisting of optical fibers and light pipes.

12. The system of claim 10, wherein said mechanism includes a monochromator.

13. The system of claim 12, wherein said monochromator is a filter.

* * * * *